United States Patent
Beck

(10) Patent No.: US 10,274,102 B2
(45) Date of Patent: Apr. 30, 2019

(54) VALVE ACTUATOR, VALVE AND METHOD FOR CONTROLLING A VALVE ACTUATOR

(71) Applicant: Buerkert Werke GmbH, Ingelfingen (DE)

(72) Inventor: Klaus Beck, Gommersdorf (DE)

(73) Assignee: Buerkert Werke GmbH, Ingelfingen (DE)

( * ) Notice: Subject to any disclaimer, the term of this patent is extended or adjusted under 35 U.S.C. 154(b) by 561 days.

(21) Appl. No.: 14/749,711

(22) Filed: Jun. 25, 2015

(65) Prior Publication Data

US 2016/0169409 A1 Jun. 16, 2016

(30) Foreign Application Priority Data

Jun. 25, 2014 (DE) .................. 10 2014 108 923

(51) Int. Cl.
| | |
|---|---|
| *F16K 31/04* | (2006.01) |
| *F16K 31/08* | (2006.01) |
| *F16K 35/16* | (2006.01) |
| *H02K 29/03* | (2006.01) |
| *H02K 7/106* | (2006.01) |

(52) U.S. Cl.
CPC .............. *F16K 35/16* (2013.01); *F16K 31/04* (2013.01); *F16K 31/08* (2013.01); *H02K 7/106* (2013.01); *H02K 29/03* (2013.01)

(58) Field of Classification Search
None
See application file for complete search history.

(56) References Cited

U.S. PATENT DOCUMENTS

| 4,484,095 A * | 11/1984 | Neumann ................ H02K 7/12 |
| | | 310/82 |
| 6,097,122 A | 8/2000 | Bock |
| 6,573,627 B2 * | 6/2003 | Sun ........................ H02K 7/063 |
| | | 310/268 |
| 8,106,552 B2 * | 1/2012 | Kim ...................... H02K 7/063 |
| | | 310/81 |
| 2011/0025156 A1 * | 2/2011 | Groening ............... H02K 49/06 |
| | | 310/93 |
| 2015/0234391 A1 * | 8/2015 | Sabadin .................. F16K 3/085 |
| | | 137/1 |

OTHER PUBLICATIONS

English summary of Search Report dated May 22, 2015 by the German Patent and Trademark Office for German Patent Application No. DE 10 2014 108 923.5.

* cited by examiner

*Primary Examiner* — Marina A Tietjen
*Assistant Examiner* — Daphne M Barry
(74) *Attorney, Agent, or Firm* — Dilworth IP, LLC

(57) ABSTRACT

A valve actuator for a valve has an electric motor which comprises a rotor and a stator, and further a magnetic detent brake with at least one detent magnet for holding the rotor in a detent position. The least one rotor magnet is arranged on the rotor and co-operates with the detent brake.

12 Claims, 5 Drawing Sheets

VALVE ACTUATOR, VALVE AND METHOD FOR CONTROLLING A VALVE ACTUATOR

The invention relates to a valve actuator for a valve, a valve having a valve actuator and a method for controlling a valve actuator for a valve.

BACKGROUND OF THE INVENTION

The position of a valve element and as a result the through-flow of a medium through a valve can be adjusted via a valve actuator. The valve actuator typically includes an electric motor which is coupled to the valve element via a gear mechanism and a spindle, which valve element is associated with a valve seat in order to control or regulate the through-flow through the valve. Generally, it is desirable to design the valve actuator to be as low in friction as possible, whereby the required displacement forces are reduced and the efficiency of the valve actuator is increased accordingly. This can be achieved, for example, in that the spindle is produced with an extremely high level of quality so that the friction thereof is minimised. Such a spindle is also referred to as a super low friction spindle.

However, it has proved to be disadvantageous that the valve element can be displaced owing to the pressure of the medium, since the low friction spindle does not have a self-locking effect counteracting the opening moment resulting from the pressure of the medium. Therefore, although the valve is highly efficient in terms of displaceability, it cannot be securely held in a desired position.

The object of the invention is to provide a valve actuator which has a high level of efficiency and at the same time the valve can be securely held in an adjusted position.

BRIEF DESCRIPTION OF THE INVENTION

The object is achieved in accordance with the invention by a valve actuator for a valve, having an electric motor, comprising a rotor and a stator, and having a magnetic detent brake with at least one detent magnet for holding the rotor in a detent position, wherein at least one rotor magnet is arranged on the rotor and co-operates with the detent brake and is formed in particular as a permanent magnet.

The principle of the invention is to provide the valve actuator with a magnetic detent brake which acts on the electric motor, in particular the rotor, such that the rotor magnets interact in particular positions with the at least one detent magnet. As a result, a detent moment is produced which is higher than the opening moment produced by the pressure of the medium. External locking of the valve actuator is produced thereby which ensures that the pressure of the medium cannot displace the valve. Owing to the externally produced locking, the valve actuator can be formed with a super low friction spindle, in particular a recirculating ball screw, and therefore the valve actuator has a high level of efficiency during displacement and nevertheless it is ensured that the valve is held in the intended position. The efficiency of the valve actuator is considerably higher compared with a valve actuator having a self-locking gear mechanism or spindle. Designing the detent brake as a magnetic detent brake additionally ensures that wear does not occur on the detent brake, as would be the case for a mechanical detent brake. The electric motor can be, for example, a brushless electric motor since this is particularly efficient, whereby the efficiency of the entire valve actuator is increased accordingly. Furthermore, an energy-saving valve actuator is hereby produced.

The stator can be designed as a coil carrier which includes a main body and coil holding sections, in particular six coil holding sections, facing the rotor and spaced apart from the main body, coils being provided on the coil holding sections. The stator simultaneously forms a housing part of the electric motor. The stator can further consist of a ferromagnetic or magnetisable material. The coils of the brushless electric motor are provided on the housing part and can be used to generate a rotating field which serves to actuate the rotor. The rotor typically comprises a plurality of rotor magnets, e.g., eight rotor magnets, which interact with the generated rotating field. By designing the stator as a housing part, an embodiment of the electric motor which saves on material and is simple to produce is possible.

In accordance with one aspect of the invention, the detent brake, in particular the detent magnet, forms a magnetic circuit with the stator. Accordingly, the stator is magnetised by the detent brake or the detent magnets, and therefore the stator itself is part of the magnetic circuit which emanates from the detent magnets.

In particular, the detent magnet is strong in relation to the design and/or material of the stator such that the stator achieves its saturation magnetisation. The detent magnet produces such a strong magnetic field that the magnetic field has a high field line density. Since the stator is magnetised by the detent magnet as far as the saturation magnetisation, the remaining magnetic field lines which do not contribute to the saturation of the stator can interact with the at least one rotor magnet in order to hold the rotor in its detent position. The detent magnet thus forms in the stator two magnetic circuits: one closed or saturated magnetic circuit (magnetic short circuit) and one additional magnetic circuit which serves to generate the detent moment. Therefore, owing to the strong magnetic field of the detent magnet, not only a magnetic short circuit occurs, which would occur for example if the detent magnet is too weak and the housing part does not achieve its saturation magnetisation. The magnetic field emanating from the detent magnet orientates the molecular magnets provided in the material of the stator, whereby the magnetic field emanating from the rotor magnet is deflected in the stator. The magnetic field emanating from the detent magnet is hereby strengthened in the stator itself. This has the result that a higher magnetic flux density is present in the stator compared with outside the stator. The magnetic field lines thus lie closer together in the stator.

In a further aspect of the invention, provision is made that the at least one detent magnet is associated with a side surface of the stator. The side surfaces are those sides through which the rotational axis of the rotor does not extend. Accordingly, the detent magnet does not act on all the provided rotor magnets at the same time but rather only on those which are associated with the side whose side surface is associated with the detent magnet, and therefore the detent magnet constrains the rotor. If the rotor is stationary, then the detent magnet generates a detent moment on the rotor magnets which are associated with the side of the housing part on which the detent magnet is arranged provided that an opening moment acts owing to the pressure of the medium. Provision can be made that the stator is surrounded by a housing element on which the detent magnet is arranged.

Furthermore, at least one recess can be provided on the side of the stator whose side surface is associated with the detent magnet, in particular such that the stator has a through-going slot. The recess is provided in the main body of the stator. The time when the stator achieves its saturation magnetisation can be adjusted via the structural design of the stator, i.e., the recess or the slot. By providing recesses and slots, the saturation magnetisation of the stator can be achieved earlier, and therefore the detent magnet can be designed to be correspondingly weaker in order to generate the required detent moment. The mechanical weakening accompanying the provision of a slot can be compensated for by a bearing shield.

According to a further aspect of the invention, the detent brake includes two detent magnets which are arranged in particular on two opposing side surfaces of the stator. The individual detent magnets can be designed to be weaker since the required detent moment is provided by the sum of the detent magnets and the respective strength thereof. Owing to the arrangement on two opposite sides or side surfaces, a homogeneously acting detent moment is generated on the rotor when an opening moment acts on the rotor.

In particular, the detent brake can include at least one flux-conducting element, in particular at least one pole shoe. The magnetic field generated by the detent magnet can be diverted in a targeted manner via the flux-conducting element, and therefore this field co-operates, in dependence upon the design of the stator and the rotor, with the rotor or the at least one rotor magnet in an optimum manner in order to form an efficient detent brake. The pole shoe is arranged directly on the pole of the detent magnet.

In a further aspect of the invention, provision is made that the detent magnet is designed as a permanent magnet. The efficiency of the valve actuator is hereby increased since an additional energy supply for the detent magnet does not have to be provided, as would be the case with an electromagnet. In particular, the permanent magnet can be a rare-earth magnet, e.g., consisting of neodymium-iron-boron (NdFeB), or samarium-containing magnets, e.g., consisting of samarium-cobalt.

The invention further relates to a valve having a valve actuator of the previously described type. The valve actuator designed in such a manner ensures that the valve is securely held in its provided position. Nevertheless, the valve has a particularly high level of efficiency during displacement.

The invention further relates to a method for controlling a valve actuator for a valve comprising an electric motor and a magnetic detent brake, in which the electric motor is controlled or regulated upon start-up such that the electric motor generates a magnetic field, in particular a stationary magnetic field which weakens a magnetic field, in particular an additional magnetic field, of the magnetic detent brake. Improved running properties are hereby produced since the magnetic field generated by the detent magnet is weakened upon start-up, and therefore this magnetic field does not or not noticeably result in torque ripples or torque deviations. This improves the running properties of the valve during displacement, in particular upon start-up. Upon start-up of the electric motor, only those coils of the stator which are required to form a stationary magnetic field are actuated, which field counteracts that of the detent magnet.

BRIEF DESCRIPTION OF THE DRAWINGS

Further advantages and properties of the invention will be apparent from the following description and the drawings to which reference is made. In the drawings.

DETAILED DESCRIPTION OF THE INVENTION

Figure 1:
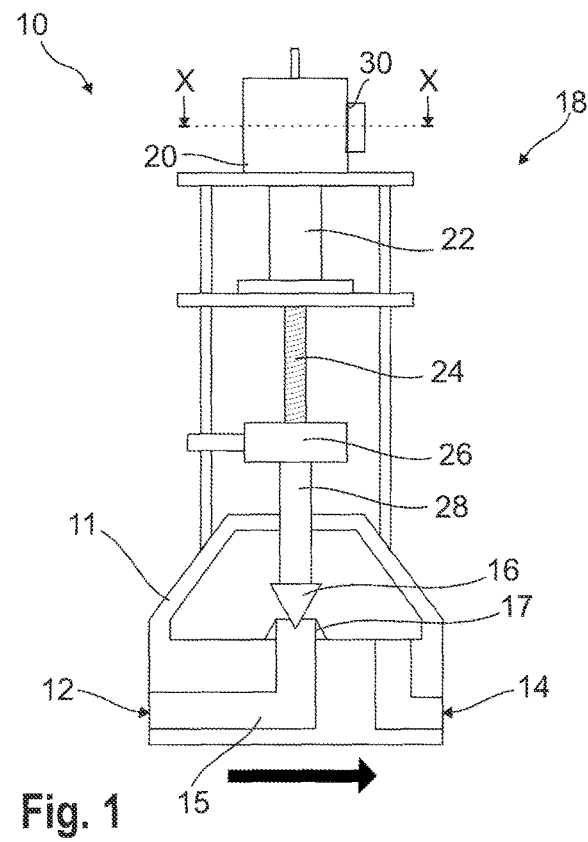
FIG. 1 shows a schematic view of a valve in accordance with the invention.

FIG. 1 illustrates a valve 10 comprising a housing 11 in which an input 12, via which a medium flows into the valve 10, and an output 14, via which the medium can leave the valve 10, are provided.

The valve 10 comprises a flow path 15 between the input 12 and the output 14 in which a valve element 16 is provided which can co-operate with a valve seat 17 in order to influence the flow rate. The valve element 16 is designed as a seal cone in the illustrated embodiment.

The valve element 16 is coupled to a valve actuator 18, and therefore the valve element 16 can be displaced by the valve actuator 18 if another flow rate through the valve 10 is to be set.

The valve actuator 18 includes an electric motor 20 which can be designed as a brushless electric motor, and a gear mechanism 22 which transfers the torque generated by the electric motor 20 to a spindle 24. In particular, this is a reduction gear unit.

The spindle 24 is further securely held and guided by a threaded nut 26 which is arranged on a housing 10 of the valve 12. The threaded nut 26 co-operates with the spindle 24 in order to convert a rotary movement of spindle 24 into an axial displacement. The spindle 24 transitions from the threaded nut 26 into a cylindrical tappet 28 which is directly coupled to the valve element 16 and is likewise part of the valve actuator 18.

Therefore, the torque generated by the electric motor 20 is transferred via the gear mechanism 22 to the spindle 24 and is then converted into an axial movement of the tappet 28 and thus of the valve element 16 in order to adjust the through-flow amount through the valve 10.

The spindle 24 can be produced with a high level of quality, and therefore it is particularly low in friction, whereby the valve actuator 18 has a high level of efficiency during displacement of the valve element 16. Owing to the high quality, the spindle 24 and the entire valve actuator 18 are not self-locking.

In order to prevent the pressure of the medium from displacing the valve element 16 and thus the entire valve 10, the valve actuator 18 additionally has a detent brake 30 which holds the valve actuator 18 in a desired position. The detent brake 30 is arranged on the electric motor 20 and co-operates therewith, as will be described with the aid of FIGS. 2 to 13.

Figures 2, 3:
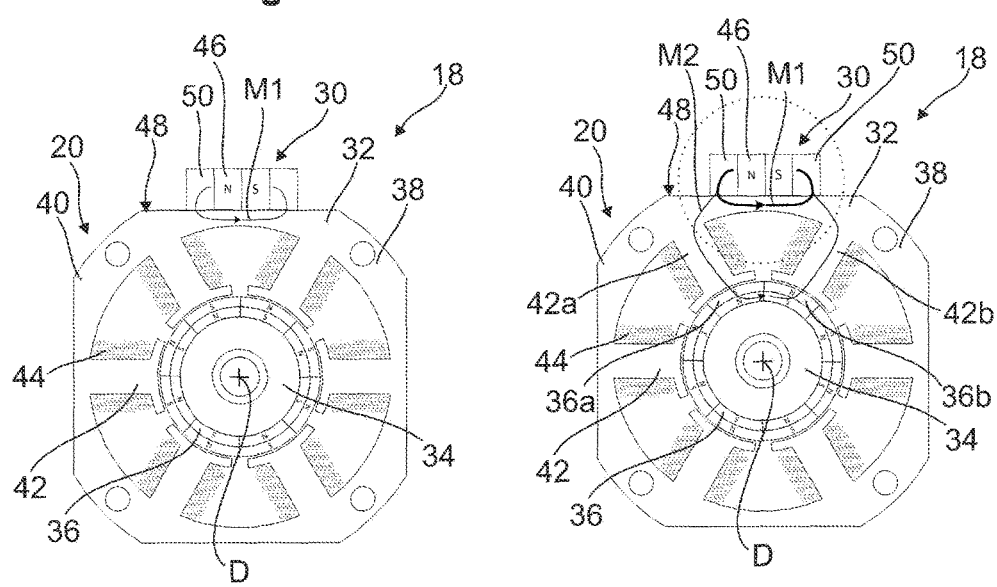
FIG. 2 shows a section along sectional line X in FIG. 1 through the rotor and stator of an electric motor which is used in the valve actuator in accordance with a first embodiment of the invention.
FIG. 3 shows a section along section line X in FIG. 1 having a valve actuator which comprises a detent magnet which is too weak.

FIG. 2 illustrates a cross-sectional view of the valve actuator 18 having the detent brake 30.

As shown in FIG. 2, the electric motor 20 is designed as a brushless electric motor comprising a stator 32 and a rotor 34 which is at least partially peripherally surrounded by the stator 32.

In the illustrated embodiment, the rotor 34 comprises eight rotor magnets 36 which are designed as permanent magnets. The rotor magnets 36 are arranged directly adjacent one another at the same radial distances around the rotational axis D of the rotor 34. They are each arranged in an alternating manner in terms of their polarity. The rotor magnets 36 are additionally designed such that the respective magnet axes of all the rotor magnets 36 meet in the rotational axis D. The magnet axis is understood to mean that axis of a rotor magnet 36 which extends centrally through the two poles. The rotor magnets 36 are arranged at the radially outer edge of the rotor 34.

The rotor magnets 36 are designed as permanent magnets, in particular as rare-earth magnets.

At the same time, the stator 32 forms a housing part 38 and consists of a magnetisable material, e.g., a ferromagnetic material. The stator 32 includes a main body 40 and coil holding sections 42 facing the rotor 34 and spaced apart from the main body 40. Air gaps are formed between each of the coil holding sections 42, whereby the housing part 38 or the stator 32 is designed so as to save on material.

In the illustrated embodiment, the stator 32 has a total of six coil holding sections 42 which each hold a coil 44. The coil holding sections 42 are arranged distributed peripherally at equal distances in relation to the rotational axis D, and therefore two coil holding sections 42 always lie diametrically opposite one another.

This ensures that an electromagnetic rotating field can be generated via the coils 44, said field actuating the rotor 34, and therefore during operation this rotor is rotated about the rotational axis D.

FIG. 2 further shows that the magnetic detent brake 30 includes a detent magnet 46 which is associated with a side surface of the stator 32, wherein the side surface is understood to mean any surface through which the rotational axis D of the rotor 34 does not extend. This ensures that the detent magnet 46 does not simultaneously act on all the detent magnets 36 arranged on the rotor 34 but rather only on those which are associated with the corresponding side surface, as will be explained hereinafter.

In the illustrated embodiment, the magnetic detent brake 30 is arranged directly on the corresponding side 48 of the stator 32. This is due, inter alia, to the fact that the stator 32 simultaneously forms the housing part 38. If the stator 32 was surrounded e.g., by a further housing element, then the detent brake 30 can also be arranged on the further housing element if it is ensured that a good magnetic flux can be formed from the housing element to the stator.

Since the stator 32 consists of a magnetisable or ferromagnetic material, the magnetic field lines emanating from the detent magnet 46 are concentrated in the stator 32, whereby a stronger magnetic flux density is present in the stator 32 than outside the stator 32. Typically, the detent magnet 46 is magnetically short circuited via the stator 32.

The detent magnet 46 is designed to be strong such that it magnetises the stator 32 up to its saturation magnetisation.

This means that a magnetic short circuit or a closed magnetic circuit M1 is present (magnetic field line shown as a bold line) which extends through the saturated stator 32.

Since the stator 32 is already magnetised to a saturated extent and owing to the high strength of the detent magnet 46, there is, in addition to the magnetic short circuit M1 of the detent magnet 46, a further array of magnetic field lines, of which only one individual magnetic field line is illustrated. These magnetic field lines form an additional magnetic circuit M2.

The additional magnetic circuit M2 extends via the main body 40 of the stator 32 and a coil holding section 42a adjacent to the detent magnet 46. The magnetic circuit M2 exits the housing part 38 via the coil holding section 42a in order to extend over a rotor magnet 36a which lies against the coil holding section 42a. The additional magnetic circuit M2 further extends from the rotor magnet 36a to a directly adjacent rotor magnet 36b which is oriented opposite the rotor magnet 36a in terms of the polarity. The additional magnetic circuit M2 extends over this rotor magnet 36b from the rotor 34 back to the stator 32 since it is transferred to another coil holding section 42b which lies against the rotor magnet 36b and is likewise adjacent to the detent magnet 46. The additional magnetic circuit M2 extends from this coil holding section 42b back to the detent magnet 46 and terminates there.

The molecular magnets of the magnetisable stator 32 are oriented owing to the external magnetic field of the detent magnet 46. The external magnetic field can further be influenced by the rotor magnets 36.

A holding force is thus exerted on the rotor 34 via this additional magnetic circuit M2 since the magnetic circuit M2 partly extends over the rotor 34 and couples it magnetically to the stator 32. As a result, it is possible for the rotor 34 to be held in the provided position against the opening moment of the pressure of the medium since the holding force then produces a detent moment.

Furthermore, the detent brake 30 includes at least one flux-conducting element 50 which, in the illustrated embodiment, is arranged directly on the detent magnet 46 in order to divert the field fines emanating from the detent magnet 46 in a targeted manner into the stator 32. In each case, a flux-conducting element 50 is allocated to the two poles of the detent magnet 46.

FIG. 3 illustrates the same structural arrangement, wherein, however, the detent magnet 46 is designed to be weaker. The weak detent magnet 46 cannot magnetise the housing part 38 up to its saturation magnetisation (magnetic field fine shown as a thin line), whereby no additional magnetic circuit extending over the rotor 34 can arise. Therefore, there is merely a magnetic short circuit M1 extending through the stator 32. Accordingly, a detent moment cannot be generated hereby. Therefore, owing to the detent magnet 46 being too weak, FIG. 3 does not represent an embodiment of the invention.

Figure 4:
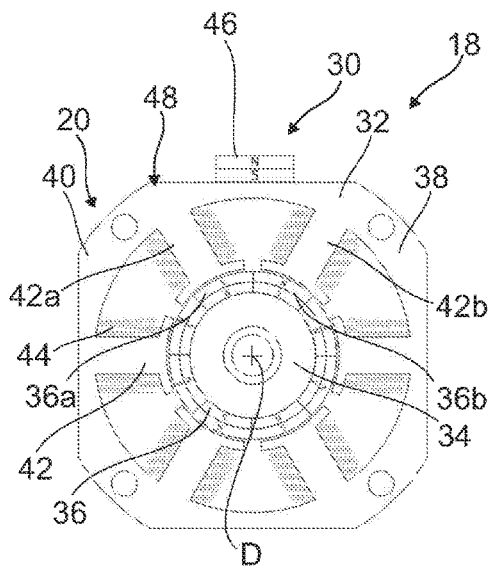
FIG. 4 shows a second embodiment of the invention in a section along sectional line X in FIG. 1.
Figure 5:
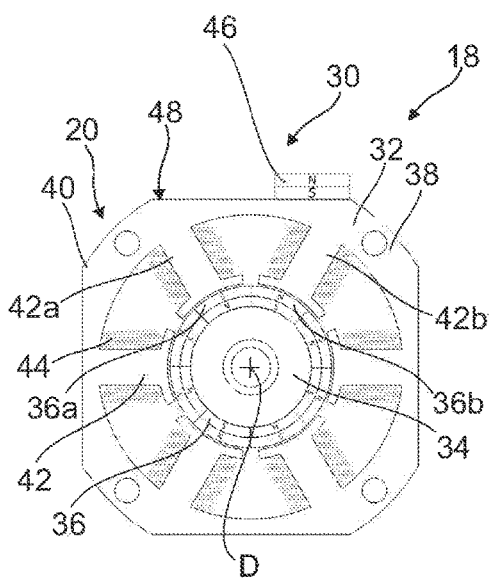
FIG. 5 shows a third embodiment in a section along sectional line X in FIG. 1.
Figure 6:
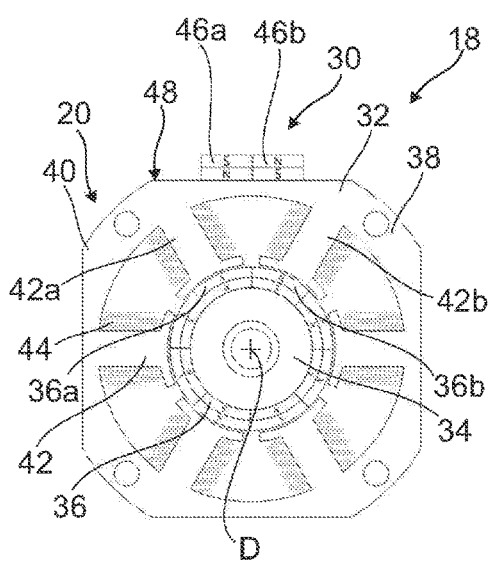
FIG. 6 shows a fourth embodiment in a section along sectional line X in FIG. 1.

FIGS. 4 to 6 illustrate further embodiments of the valve actuator 18, wherein the embodiment of FIG. 4 differs from that of FIG. 2 in that the detent magnet 46 is arranged differently oriented on the side 48 of the stator 32.

Despite the arrangement of the detent magnet 46, which is rotated by 90° compared with the embodiment of FIG. 2, it is possible for the detent magnet 46 to completely magnetise the stator 32 in the case of an appropriately high magnetic strength. As a result, the stator 32 achieves its saturation magnetisation and the additional magnetic circuit M2 can be formed, but this is not illustrated in this figure. This is primarily due to the fact that the stator 32 consists of a magnetisable or ferromagnetic material which accordingly reinforces the magnetic field lines of the detent magnet 46.

In a similar manner to the previous embodiment, the additional magnetic circuit M2 fixes the rotor 34 in a provided position.

In accordance with FIG. 5, the detent magnet 46 is arranged, not centrally, but laterally offset, on the side 48. The fixing of the rotor 34 in the provided position can be precisely adjusted hereby since the magnetic field emanating from the detent magnet 46 is not precisely the same size in the adjacent coil holding sections 42*a*, 42*b*. This produces a different holding force on the rotor 34.

FIG. 6 illustrates a further embodiment of the valve actuator 18, wherein the detent brake 30 comprises two detent magnets 46*a*, 46*b* which are arranged on the same side 48 of the stator 32.

The two detent magnets 46 are thereby arranged opposite one another in terms of their polarity, and therefore a magnetic field similar to that in FIG. 2 is generated via the two detent magnets 46. Owing to the design of the detent brake 30 with two detent magnets 46, the two detent magnets 46 can each be designed to be weaker than the detent magnet 46 in the embodiment of FIG. 2. Nevertheless, a detent moment of the same size can be achieved owing to the higher number of detent magnets 46.

Figure 7:
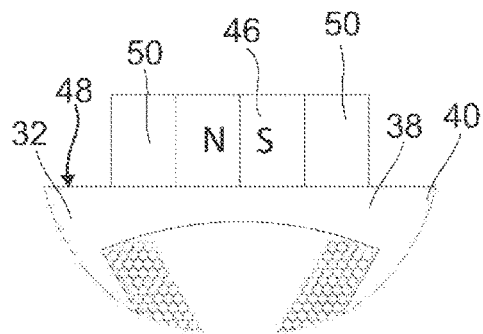
FIG. 7 shows an enlarged detail of the stator from FIG. 2 in the region of the detent magnet.
Figure 8:
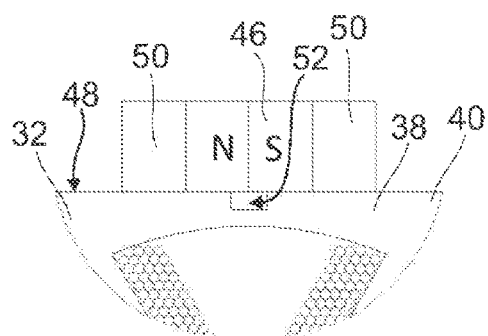
FIG. 8 shows a view corresponding to FIG. 7, illustrating a fifth embodiment.
Figure 9:
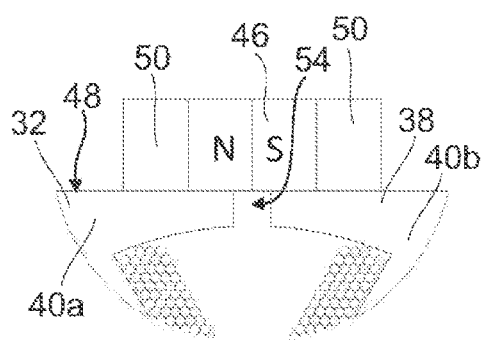
FIG. 9 shows a view corresponding to FIG. 7, illustrating a sixth embodiment.

FIGS. 7 to 9 illustrate a detail of the stator 32 which is encircled by a dotted line in FIG. 2.

FIG. 7 corresponds precisely to the design in FIG. 2, in which the detent magnet 46 lies with all of its surface on the housing side 48.

FIG. 8 illustrates an embodiment in which the stator 32 comprises a recess 52 in the region of the detent magnet 46, which recess is perpendicular to the magnetic flux of the closed magnetic circuit M1. Owing to this recess 52, the detent magnet 46 can be designed to be weaker since the housing part 38 achieves its saturation magnetisation easier.

The recess 52 is provided in the main body 40 of the stator 32 and extends, in the illustrated exemplified embodiment, to approximately half the thickness of the main body 40. The thickness is defined as the material thickness of the main body 40 in the radial direction in relation to the rotational axis D of the rotor 34.

The required saturation magnetisation can be further reduced in that the recess provided on the side 48 is designed as a through-going slot 54, as illustrated in the embodiment of FIG. 9. Therefore, the slot 54 extends over the entire thickness of the main body 40, and therefore a gap is produced between two main body sections 40*a*, 40*b*, which gap is likewise perpendicular to the magnetic flux of the magnetic circuit M1.

In this embodiment, the electric motor 20, in particular the entire stator 32, is stabilised in that bearing shields, not illustrated, hold the stator 32 in a fixed position. This means that the stator 32 is clamped between the two bearing shields and is stabilised thereby.

Figure 10:
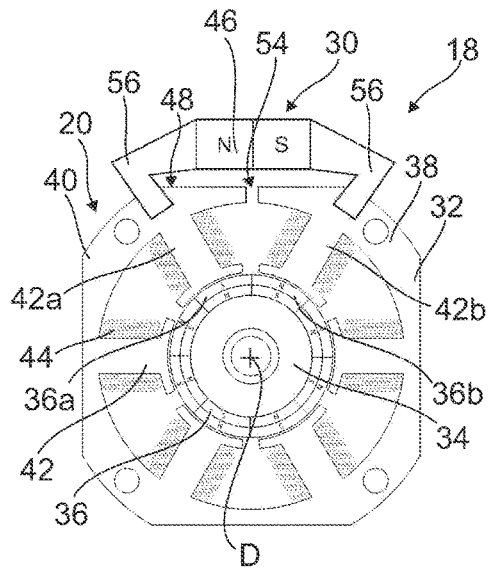
FIG. 10 shows a seventh embodiment in a section along sectional line X in FIG. 1.
Figure 11:
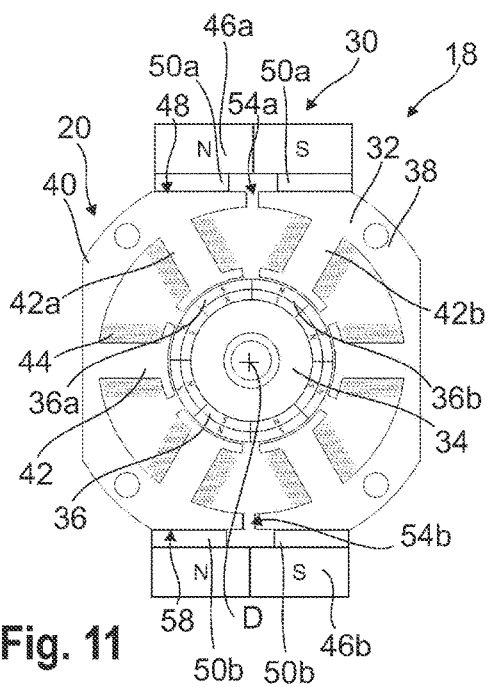
FIG. 11 shows a eighth embodiment in a section along sectional line X in FIG. 1.

FIGS. 10 and 11 illustrate further embodiments of the valve actuator 18.

In the valve actuator 18 in accordance with the embodiment shown in FIG. 10, the flux-conducting elements 50 are designed as pole shoes 56, whereby an even stronger or directed magnetic field diversion of the detent magnet 46 can occur.

The pole shoes 56 extend, in the illustrated embodiment, into the stator 32, whereby a secure arrangement of the detent brake 30 on the stator 32 is guaranteed. Furthermore, the magnetic field emanating from the detent magnet 46 is directed onto the adjacent coil holding sections 42*a*, 42*b* directly.

In this embodiment, the stator 32 likewise comprises a slot 54 which divides the main body 40 on the side 48 on which the detent magnet 46 is arranged.

FIG. 11 illustrates an embodiment of the valve actuator 18 in which the detent brake 30 again comprises two detent magnets 46 which are arranged on opposite sides 48, 58 of the stator 32 or the side surfaces thereof. The two detent magnets 46 lie against the sides 48, 58 via correspondingly allocated flux-conducting elements 50*a*, 50*b*.

The strength of the individual detent magnets 46 can again be reduced hereby, but nevertheless a detent moment can be generated which is the same size compared with the embodiment of FIG. 2. Furthermore, owing to the arrangement of the detent magnets 46 on the opposite sides 48, 58, an homogeneous detent moment acting on the rotor 34 can be generated.

The housing part 38 further has two slots 54*a*, 54*b* which are provided on the corresponding sides 48, 58, and therefore the saturation magnetisation of the stator 32 is reduced. As a result, the detent magnets 46 can be designed to be even weaker in order nevertheless to generate the required detent moment.

Figure 12:
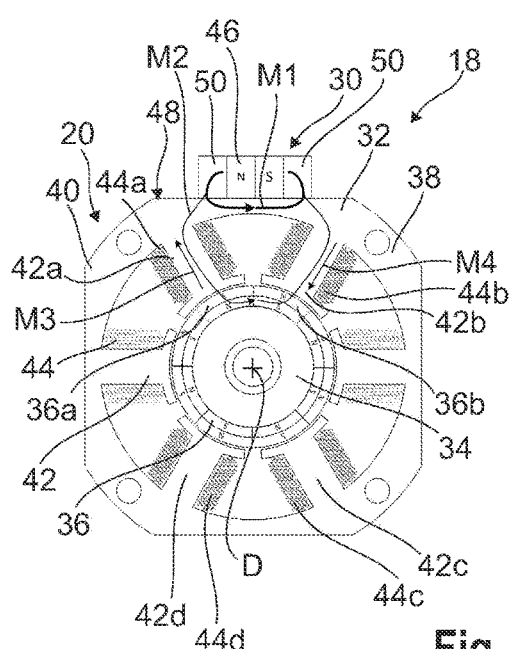
FIG. 12 shows the embodiment illustrated in FIG. 2 during operation.

FIG. 12 illustrates the embodiment of the valve actuator 18 illustrated in FIG. 2 and will be used hereinafter to explain a method for controlling the valve actuator 18.

Figure 13:
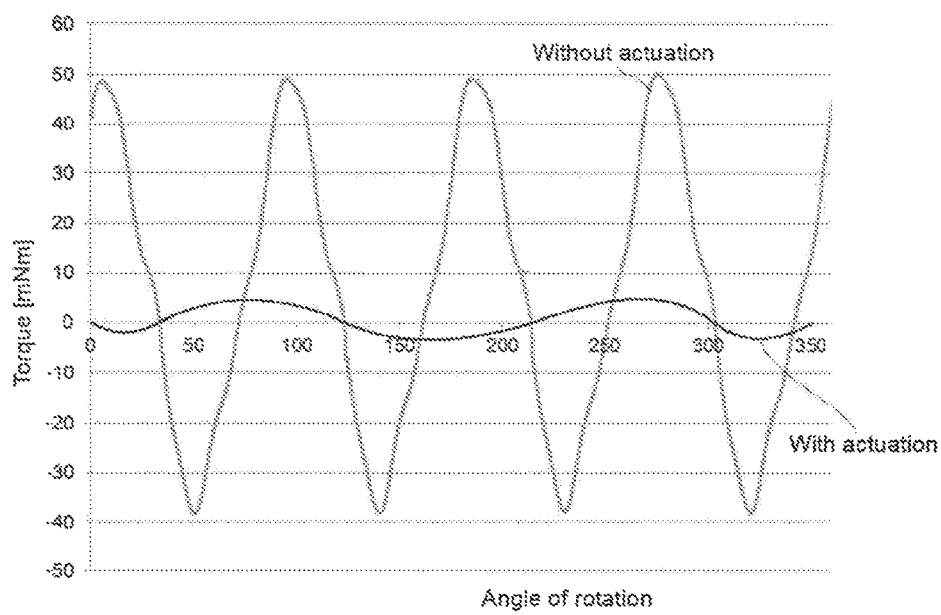
FIG. 13 shows a diagram in which the detent moment on the rotor acting upon start-up is illustrated comparatively with and without start-up control.

The coils 44 of the stator are activated by a controller such that at least one stationary magnetic field M3, M4 is generated which counteracts the additional magnetic field M2 of the detent magnet 46. The additional magnetic field M2 holding the rotor 34 in its detent position is compensated for as much as possible by the two stationary magnetic fields M3, M4 which are generated by the coils 44. When activating the rotor 34, the torque ripple produced owing to the detent magnets is hereby reduced and the rotor can start up uniformly (FIG. 13). As a result, the valve element can be very delicately displaced since no holding moment, or only a smaller holding moment, generated by the detent magnet 46, has to be overcome.

In order to generate the two stationary magnetic fields M3, M4, it is sufficient if only four coils 44*a* to 44*d* are actuated. The four coils 44*a* to 44*d* are those coils 44*e*. 44*b*, through whose coil holding sections 42*a*, 42*b* the additional magnetic circuit M2 extends, and the coils 44*c*, 44*d* which lie diametrically opposite the first-mentioned coils 44*a*, 44*b* in relation to the rotor axis D.

What is claimed is:

1. A valve actuator for a valve, having a brushless electric motor which comprises a rotor and a stator, and further having a magnetic detent brake with at least one detent magnet for holding said rotor in a detent position, wherein at least one rotor magnet is arranged on said rotor and wherein the at least one rotor magnet co-operates with said detent brake when holding said rotor in the detent position, wherein the stator comprises coils that generate a rotating electromagnetic field that interacts with the at least one rotor magnet in order to actuate the rotor, wherein said stator is magnetized by said detent magnet, wherein said detent magnet has a magnetic strength such that said stator achieves saturation magnetization and forms a magnetic circuit which includes the detent magnet and extends through the magnetically saturated stator, and wherein remaining magnetic field lines, which do not contribute to the saturation of said stator, interact with said at least one rotor magnet in order to hold said rotor in said detent position.

2. The valve actuator of claim 1 wherein said detent brake comprises a permanent magnet.

3. The valve actuator of claim 1 wherein said detent brake includes a permanent magnet and said permanent magnet forms said magnetic circuit.

4. The valve actuator of claim 1 wherein said at least one detent magnet is associated with a side surface of said stator.

5. The valve actuator of claim 1 wherein at least one recess is provided on a side of said stator with which said detent magnet is associated.

6. The valve actuator of claim 5 wherein said recess is an opening extending through the side surface of said stator.

7. The valve actuator of claim 1 wherein said detent brake comprises two of said detent magnets which are arranged on opposite sides of said stator.

8. The valve actuator of claim 1 wherein said detent brake includes at least one flux-conducting element.

9. The valve actuator of claim 8 wherein said flux-conducting element is a pole shoe.

10. A valve having a valve actuator, said valve actuator having a brushless electric motor which comprises a rotor and a stator, and further having a magnetic detent brake with at least one detent magnet for holding said rotor in a detent position, wherein at least one rotor magnet is arranged on said rotor and wherein the at least one rotor magnet co-operates with said detent brake, wherein the stator comprises coils that generate a rotating electromagnetic field that interacts with the at least one rotor magnet in order to actuate the rotor, wherein said valve comprises an input, via which a medium flows into said valve, an output, via which the medium can leave said valve, and a flow path between said input and said output in which a valve element is provided which co-operates with a valve seat in order to influence the flow rate; wherein the detent magnet for holding the rotor of the motor in a detent position forms a magnetic circuit with the stator, the stator being magnetized by the detent magnet, wherein the detent magnet has a magnetic strength such that the stator achieves saturation magnetization so that the stator becomes part of the magnetic circuit which emanates from the detent magnet, and wherein remaining magnetic field lines, which do not contribute to the saturation of the stator, interact with the at least one rotor magnet in order to hold the rotor in said detent position.

11. A method for controlling a valve actuator for a valve comprising a brushless electric motor which comprises a rotor and a stator and a magnetic detent brake with at least one detent magnet for holding said rotor in a detent position, wherein at least one rotor magnet is arranged on said rotor and wherein the at least one rotor magnet co-operates with said detent brake when holding said rotor in the detent position, wherein the stator comprises coils that generate a rotating electromagnetic field that interacts with the at least one rotor magnet in order to actuate the rotor, wherein said stator is magnetized by said detent magnet, wherein said detent magnet has a magnetic strength such that said stator achieves saturation magnetization and forms a magnetic circuit which includes the detent magnet and extends through the magnetically saturated stator, and wherein remaining magnetic field lines, which do not contribute to the saturation of said stator, interact with said at least one rotor magnet in order to hold said rotor in said detent position, the method comprising controlling or regulating said electric motor upon start-up such that said electric motor generates at least one magnetic field which weakens a magnetic field generated by said magnetic detent brake.

12. The method of claim 11 wherein said magnetic field of said detent brake is an additional magnetic field.

* * * * *